US007530023B2

(12) United States Patent  (10) Patent No.: US 7,530,023 B2
Carro  (45) Date of Patent: *May 5, 2009

(54) SYSTEM AND METHOD FOR SELECTING ELECTRONIC DOCUMENTS FROM A PHYSICAL DOCUMENT AND FOR DISPLAYING SAID ELECTRONIC DOCUMENTS OVER SAID PHYSICAL DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 852 days.

This patent is subject to a terminal disclaimer.

(21) Appl. No.: 10/495,236

(22) PCT Filed: Sep. 12, 2002

(86) PCT No.: PCT/EP02/11126

§ 371 (c)(1),
(2), (4) Date: Oct. 4, 2004

(87) PCT Pub. No.: WO03/042862

PCT Pub. Date: May 22, 2003

(65) Prior Publication Data

US 2005/0028092 A1  Feb. 3, 2005

(30) Foreign Application Priority Data

Nov. 13, 2001 (EP) .................................. 01480109

(51) Int. Cl.
*G06F 17/00* (2006.01)
(52) U.S. Cl. ........................ 715/754; 715/206; 715/232; 715/205; 715/805; 715/742
(58) Field of Classification Search ................. 715/512, 715/742, 754, 805; 709/232
See application file for complete search history.

(56) References Cited

U.S. PATENT DOCUMENTS 3,760,360 A  9/1973  Nordberg et al.
(Continued)

FOREIGN PATENT DOCUMENTS

JP  11-134327 A  5/1999
(Continued)

OTHER PUBLICATIONS

Robinson J. A. et al., "The LivePaper System: Augmenting Paper on an Enhanced Tabletop," Computers and Graphics, Pergamon Press Ltd., Oxford, vol. 25, No. 5, Oct. 2001 (pp. 731-743).
(Continued)

*Primary Examiner*—Doug Hutton
*Assistant Examiner*—Quoc A Tran
(74) *Attorney, Agent, or Firm*—Dillon & Yudell LLP

(57) ABSTRACT

The present invention discloses a system and a method for selecting, accessing and retrieving directly from a physical (i.e., hard-copy) document, hypertext documents located on a user workstation or on one or a plurality of servers connected to a communication network, and for displaying the retrieved hypertext documents over said physical document. The information is accessed by the user simply by touching with a finger items (i.e., words, letters, symbols, pictures, icons, . . . ) that are highlighted on an electronic hypertext document displayed over the physical document. The method, for use in a user system comprises the steps of: —identifying a physical document, this physical document comprising one or a plurality of pages; —identifying a page of said physical document; —identifying and locating an electronic document associated with the identified page referring to a document hyperlink table; said document hyperlink table comprising for each page of the physical document the identification and location of an electronic document; —accessing and retrieving the electronic document associated with the identified page; —displaying the retrieved electronic document by means of an opto-touch foil placed over the identified page.

16 Claims, 13 Drawing Sheets

Main components of the invention

U.S. PATENT DOCUMENTS

| | | | |
|---|---|---|---|
| 4,274,081 A | 6/1981 | Nomura et al. | |
| 4,348,660 A | 9/1982 | Robertsen et al. | |
| 4,550,310 A | 10/1985 | Yamaguchi et al. | |
| 4,680,430 A | 7/1987 | Yoshikawa et al. | |
| 4,849,911 A | 7/1989 | Campian | |
| 4,853,498 A | 8/1989 | Meadows et al. | |
| 4,855,725 A | 8/1989 | Fernandez | |
| 4,868,912 A | 9/1989 | Doering | 345/175 |
| 4,868,919 A | 9/1989 | Ianaka et al. | |
| 4,952,918 A | 8/1990 | Fujita et al. | |
| 4,973,960 A | 11/1990 | Mount, II | |
| 5,010,323 A | 4/1991 | Hoffman | |
| 5,070,467 A | 12/1991 | Todome | |
| 5,149,919 A | 9/1992 | Greanias et al. | |
| 5,202,828 A | 4/1993 | Vertelney et al. | |
| 5,239,152 A | 8/1993 | Caldwell et al. | |
| 5,243,149 A | 9/1993 | Comerford et al. | |
| 5,250,929 A | 10/1993 | Hoffman et al. | |
| 5,311,302 A | 5/1994 | Berry et al. | |
| 5,315,129 A | 5/1994 | Forrest et al. | |
| 5,353,016 A | 10/1994 | Kurita et al. | |
| 5,495,581 A | 2/1996 | Tsai | |
| 5,624,265 A | 4/1997 | Redford et al. | |
| 5,640,193 A | 6/1997 | Wellner | |
| 5,668,576 A | 9/1997 | Ikura et al. | |
| 5,692,073 A | 11/1997 | Cass | |
| 5,703,436 A | 12/1997 | Forrest et al. | |
| 5,706,030 A | 1/1998 | Ishigami et al. | |
| 5,757,026 A | 5/1998 | Forrest et al. | |
| 5,757,139 A | 5/1998 | Forrest et al. | |
| 5,811,833 A | 9/1998 | Thompson | |
| 5,834,893 A | 11/1998 | Bulovic et al. | |
| 5,844,363 A | 12/1998 | Gu et al. | |
| 5,861,219 A | 1/1999 | Thompson et al. | |
| 5,870,767 A | 2/1999 | Kraft, IV | |
| 5,903,729 A | 5/1999 | Reber et al. | |
| 5,905,251 A | 5/1999 | Knowles | |
| 5,915,285 A | 6/1999 | Sommer | |
| 5,917,280 A | 6/1999 | Burrows et al. | |
| 5,923,388 A | 7/1999 | Kurashima et al. | |
| 5,932,895 A | 8/1999 | Shen et al. | |
| 5,953,587 A | 9/1999 | Forrest et al. | |
| 5,957,697 A | 9/1999 | Iggulden et al. | |
| 5,986,401 A | 11/1999 | Thompson et al. | |
| 5,998,803 A | 12/1999 | Forrest et al. | |
| 6,005,252 A | 12/1999 | Forrest et al. | |
| 6,013,538 A | 1/2000 | Burrows et al. | |
| 6,013,982 A | 1/2000 | Thompson et al. | |
| 6,045,930 A | 4/2000 | Thompson et al. | |
| 6,046,543 A | 4/2000 | Bulovic et al. | |
| 6,048,630 A | 4/2000 | Burrows et al. | |
| 6,115,008 A | 9/2000 | Palalau et al. | 345/7 |
| 6,115,088 A | 9/2000 | Zhang et al. | |
| 6,150,043 A | 11/2000 | Thompson et al. | |
| 6,166,834 A | 12/2000 | Taketomi et al. | |
| 6,181,301 B1 | 1/2001 | Inoguchi et al. | |
| 6,256,009 B1 | 7/2001 | Lui et al. | |
| 6,256,649 B1 | 7/2001 | MacKinlay et al. | |
| 6,330,976 B1 * | 12/2001 | Dymetman et al. | 235/487 |
| 6,771,283 B2 | 8/2004 | Carro | |
| 7,027,038 B2 | 4/2006 | Carro | |
| 2001/0056439 A1 | 12/2001 | Carro | |
| 2002/0047870 A1 | 4/2002 | Carro | |
| 2006/0065859 A1 * | 3/2006 | Lapstun et al. | 250/566 |

FOREIGN PATENT DOCUMENTS

| | | |
|---|---|---|
| WO | WO 00/73981 | 12/2000 |

OTHER PUBLICATIONS

International Preliminary Examination Report, PCT/EP02/11126, Nov. 24, 2003.

International Search Report, PCT/EP02/11126, Sep. 12, 2003.

Brightness on Display, OE Magazine, Feb. 2001, SPIE-The International Society for Optical Engineering, http://web.archive.org/web/20010312012524/http:/www.oemagazine.com/fromTheMagaizne/feb01/brightness.html.

UDC Demonstrates Flexible and Transparent Displays at Annual Meeting, Universal Display Corporation, Jun. 23, 2000, http;/web.archive.org/web/20040619140623/http://www.universaldisplay.com/press/press-Jun. 23, 2000.htm.

Toshifumi Arai et al., Paperlink: A Technique for Hyperlinking from Real Paper to Electronic Content, Conference on Human Factors in Computing Systems in Atlanta, Georgia, 1997, p. 327-334, ACM, New York, NY.

R.J. Flynn et al., Multimedia-An Introduction, IBM Journal of Research Development, Mar. 1998, pp. 165-176, vol. 42, No. 2, IBM.

N.R. Manohar et al., A Framework for Programmable Overlay Multimedia Networks, IBM Journal of Research Development, Jul. 1999, pp. 555-577, vol. 43 No. 4, IBM.

Secret behind High Efficiency of Light Emitting Polymers disclosed, Archived Press Releases, Nov. 13, 2001, Cambridge Display Technology, http://www.cdtltd.co.uk/press/archive_press_release—_index/2001/140.asp.

Axelle Tapponnier et al., Useful links about OLED, 2005, http://www.krayenbuhl.com/index.php?location=axelle_oled.

F.R. Libsch et al., Understanding Crosstalk in High-Resolution Color Thin-Film-Transistor Liquid Crystal Displays, 1998, p. 467-479, vol. 42 No. 3/4.

W. Mark, Turning Persuasive Computing Into Mediated Spaces, IBM Systems Journal, 1999, p. 677-692, vol. 38 No. 4, IBM.

J. Jacobson et al., The Last Book, IBM Systems Journal, 1997, p. 457-463, vol. 36 No. 3, IBM.

Kelley et al., Extending User-centered Methods Beyond Interface Design to Functional Definition, Human Factors and Ergonomics Society Annual Meeting, 40th, Philadelphia, Sep. 1996, Proceedings: Human Centered Technology, Key to Future, p. 343-347, vol. 1.

Organic Light-Emitting Diodes (OLEDS), http://web.archive.org/web/20010311042934/http://www.stanfordresources.com/flat/oled.html, 2000 Stanford Resources Inc., San Jose, CA, abstract only.

Scientists Develop New Material for Efficient Flat-Panel Displays, News from Princeton University, Feb. 17, 2000, http://www.princeton.edu/pr/news/00/q1/0217-display.html, Princeton, NJ.

Science and Technology of Organic Electroluminescent Devices, Symposium G, Apr. 12-15, 1998, pp. 1-19, http://web.archive.org/web/20010117070100/http://www.mrs.org/meetings/spring98/absbo . . . .

* cited by examiner

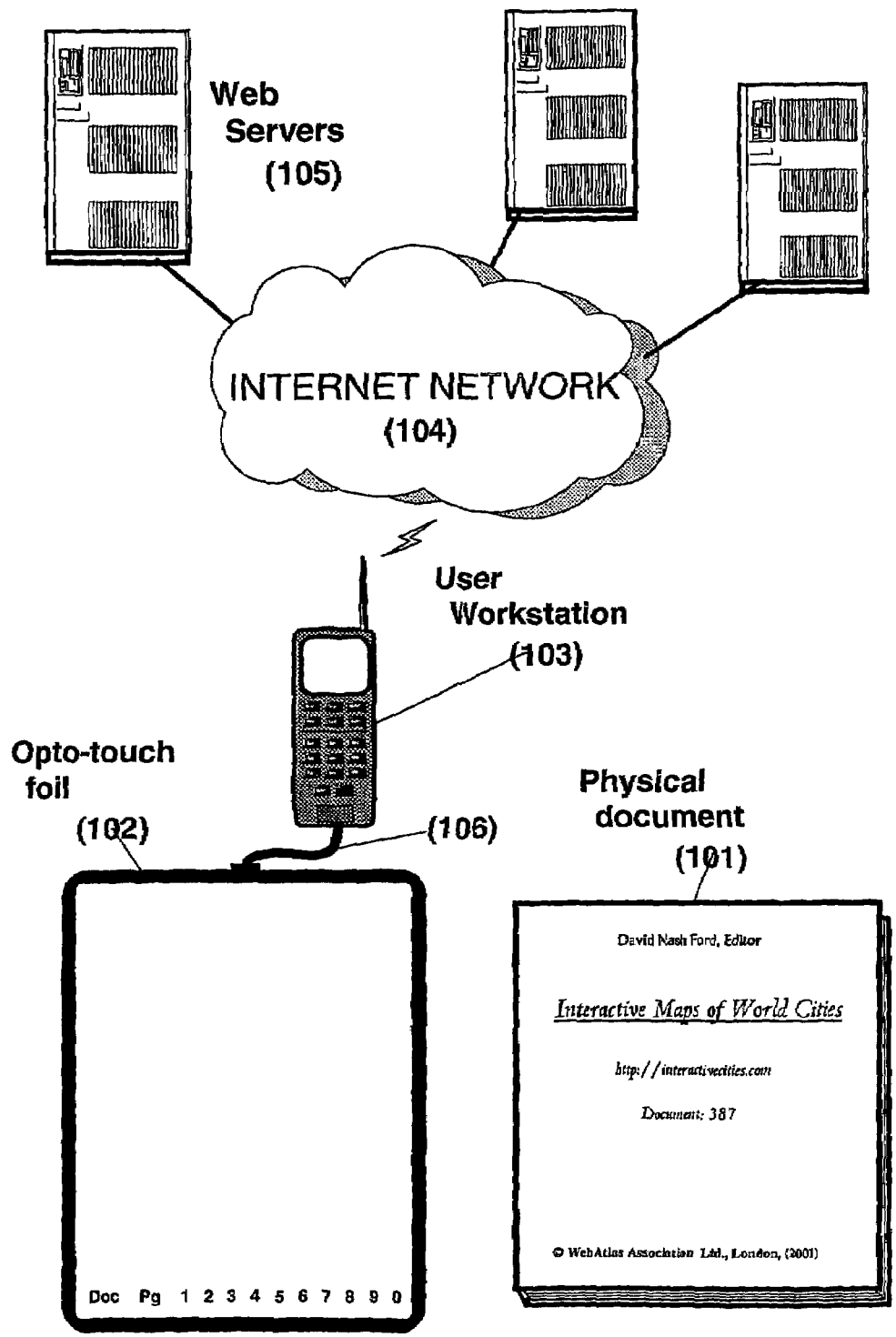
Fig. 1: Main components of the invention

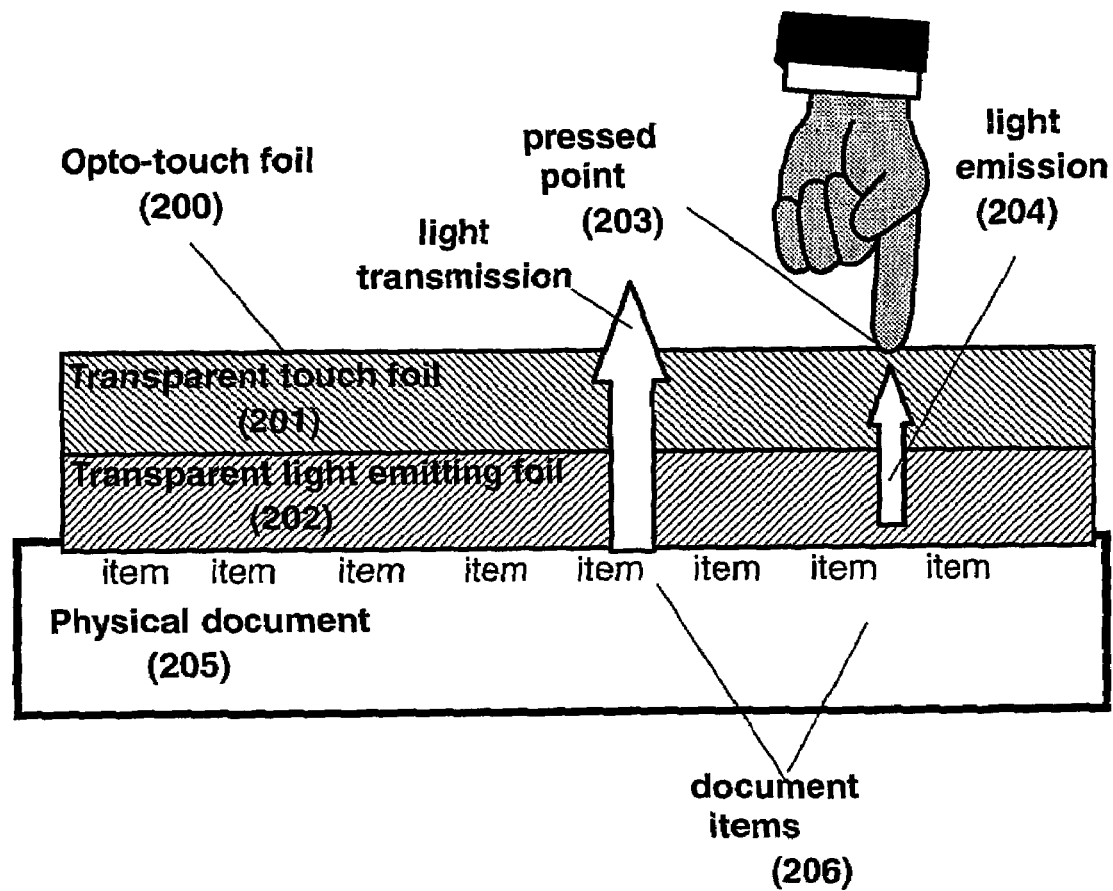
Fig. 2: The opto-touch foil

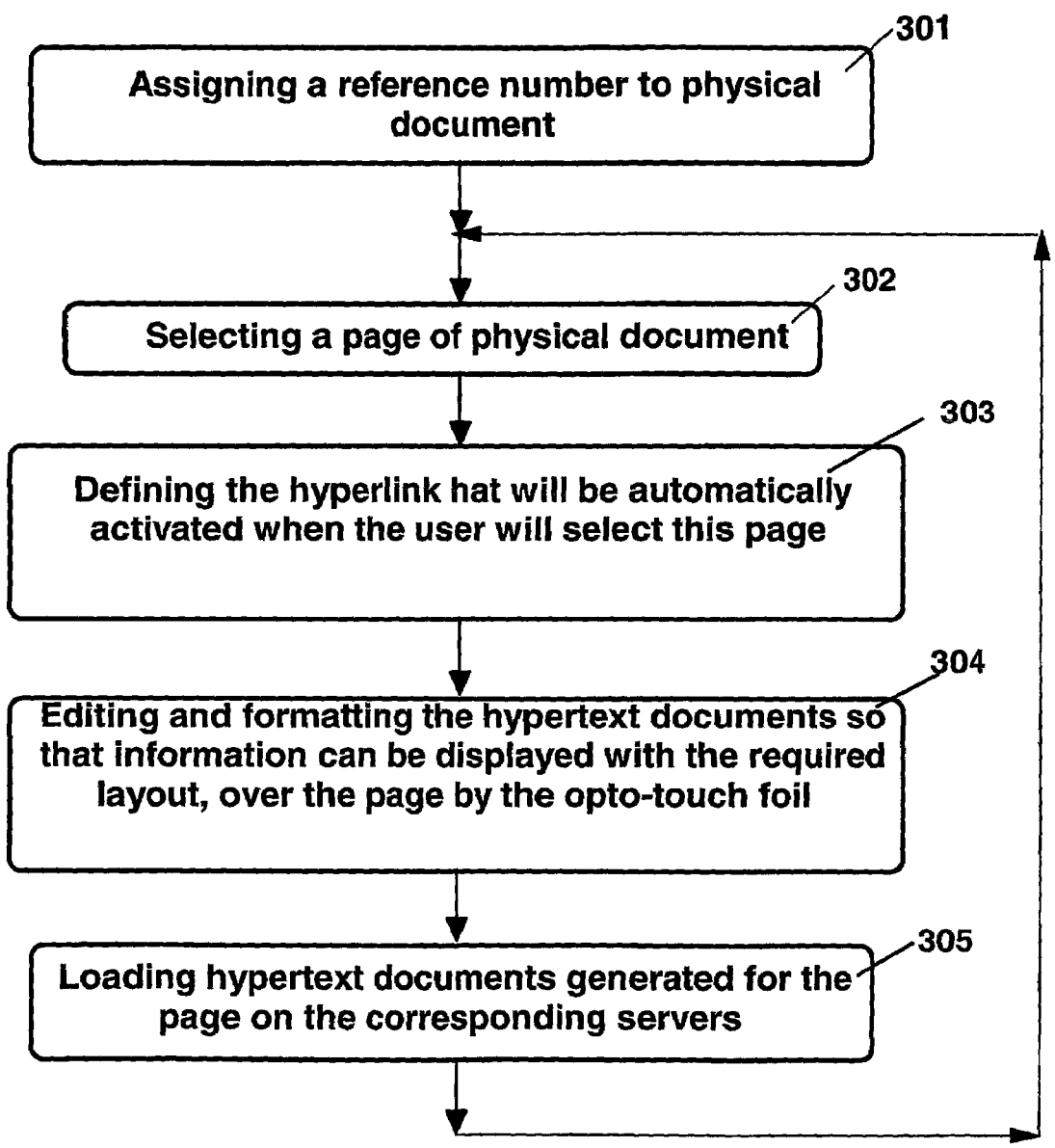
Fig. 3: Method for hyperlinking a physical document to hypertext documents displayed over said physical document

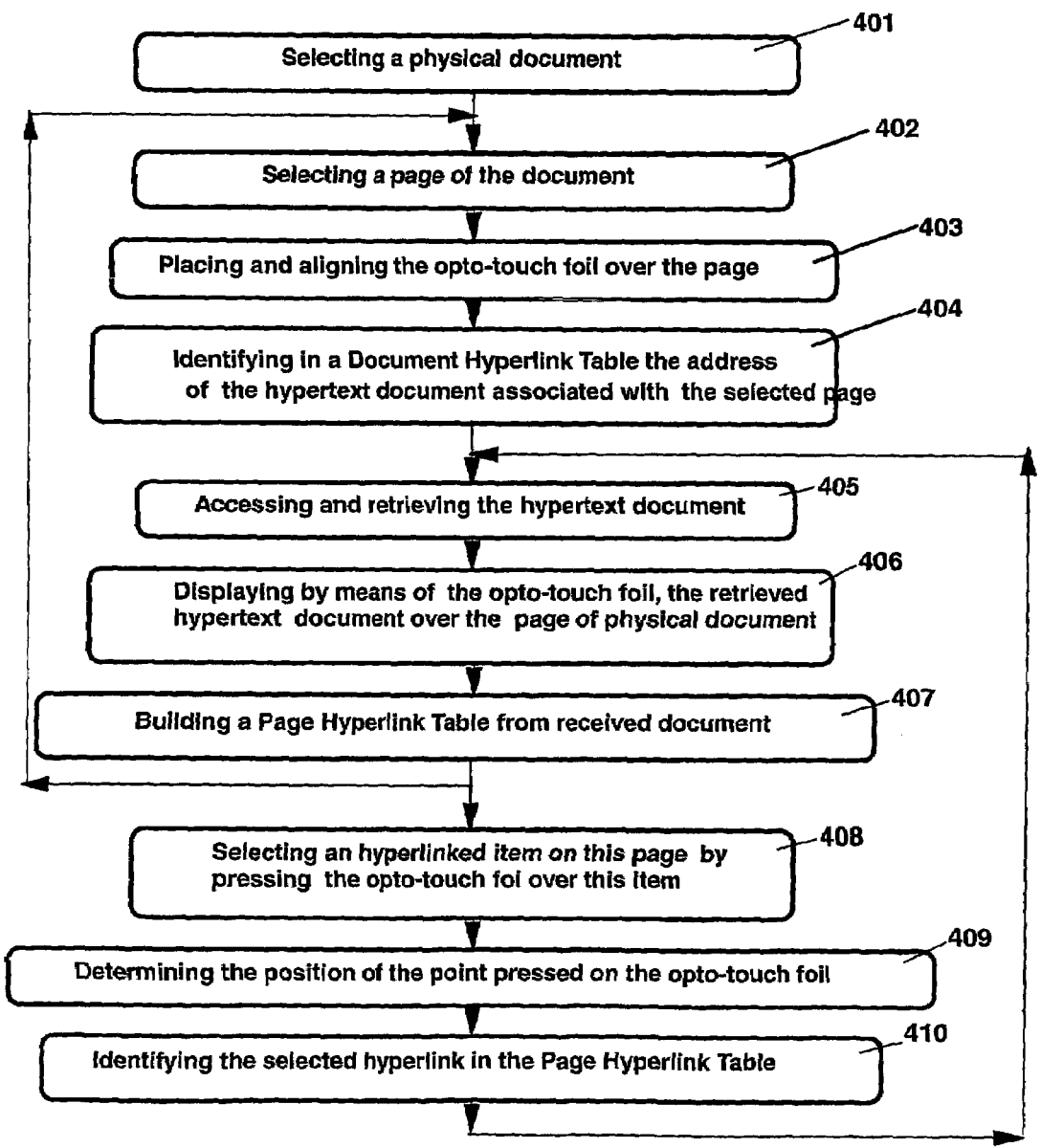
Fig. 4: Method for selecting, accessing and displaying hypertext documents over a physical document

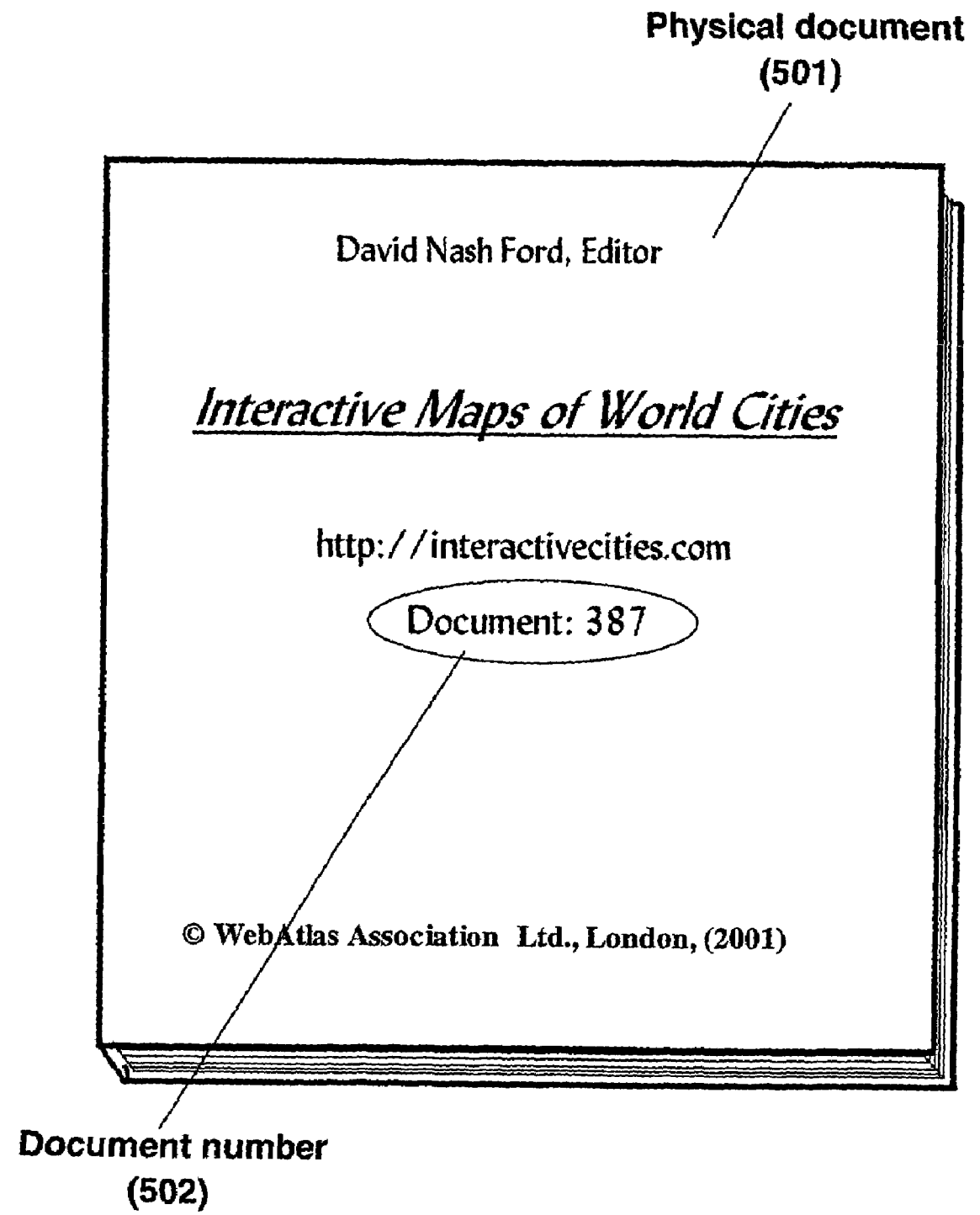
Fig. 5: A physical document

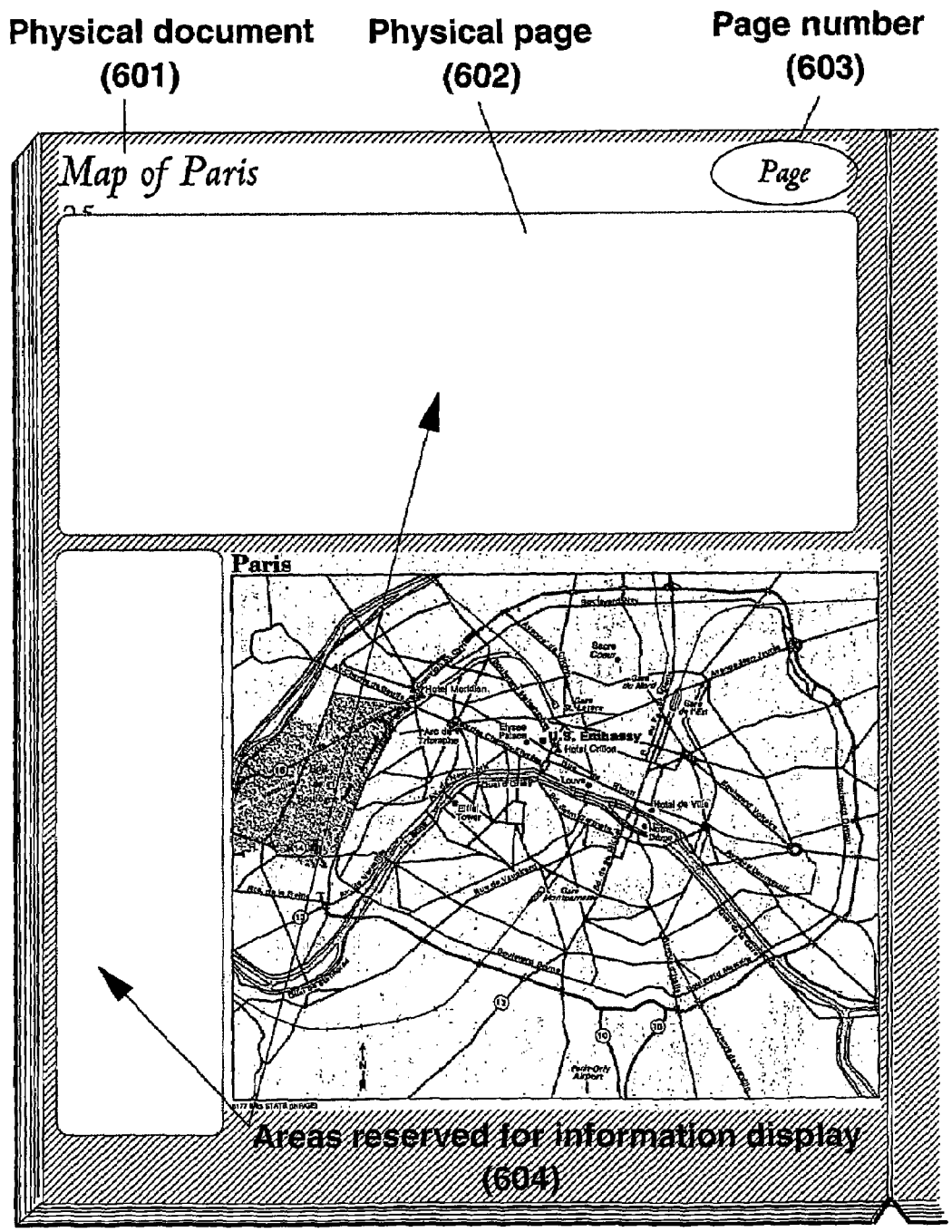
Fig. 6: A page of a physical document

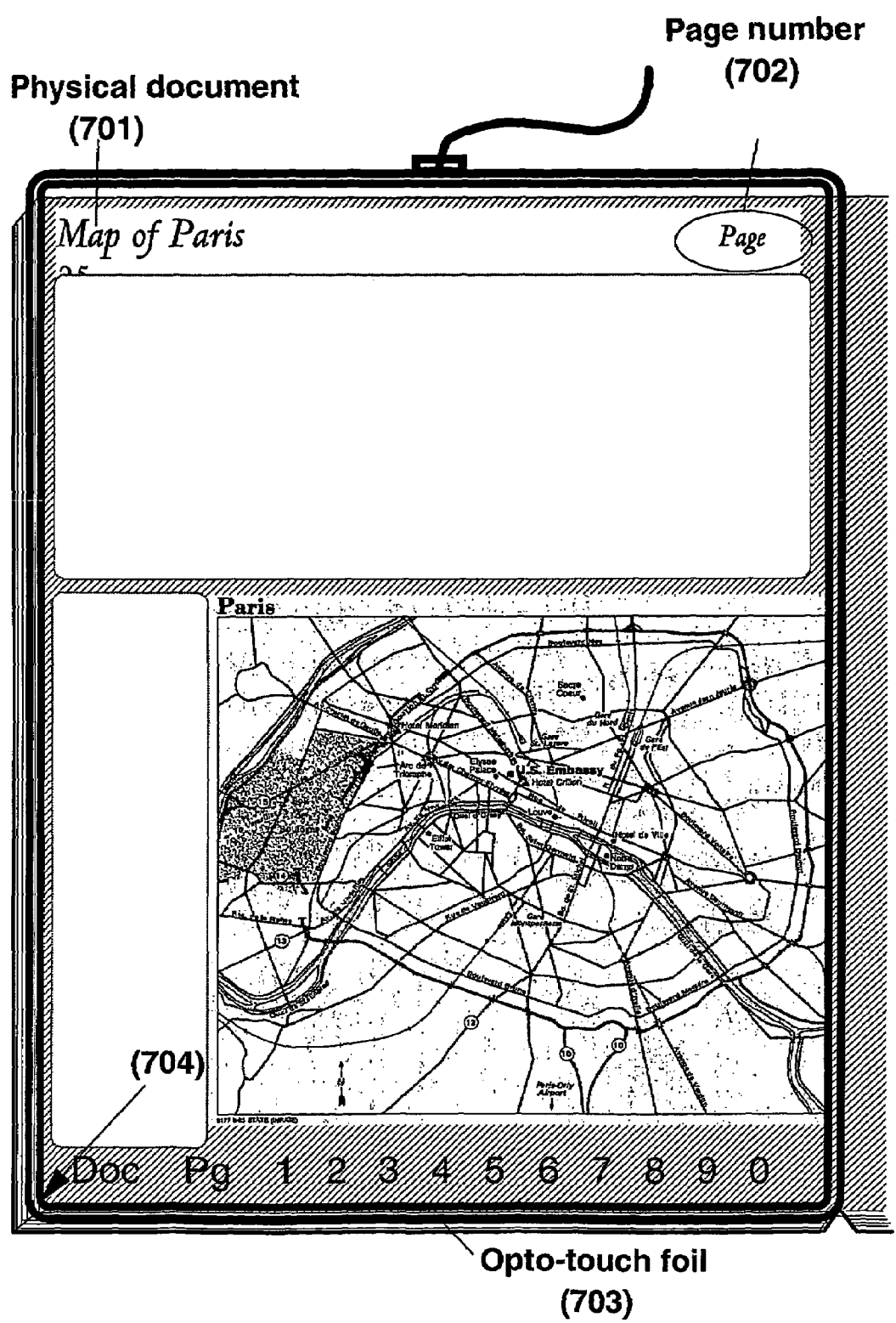
Fig. 7: The opto-touch foil is placed aligned over a page of physical document

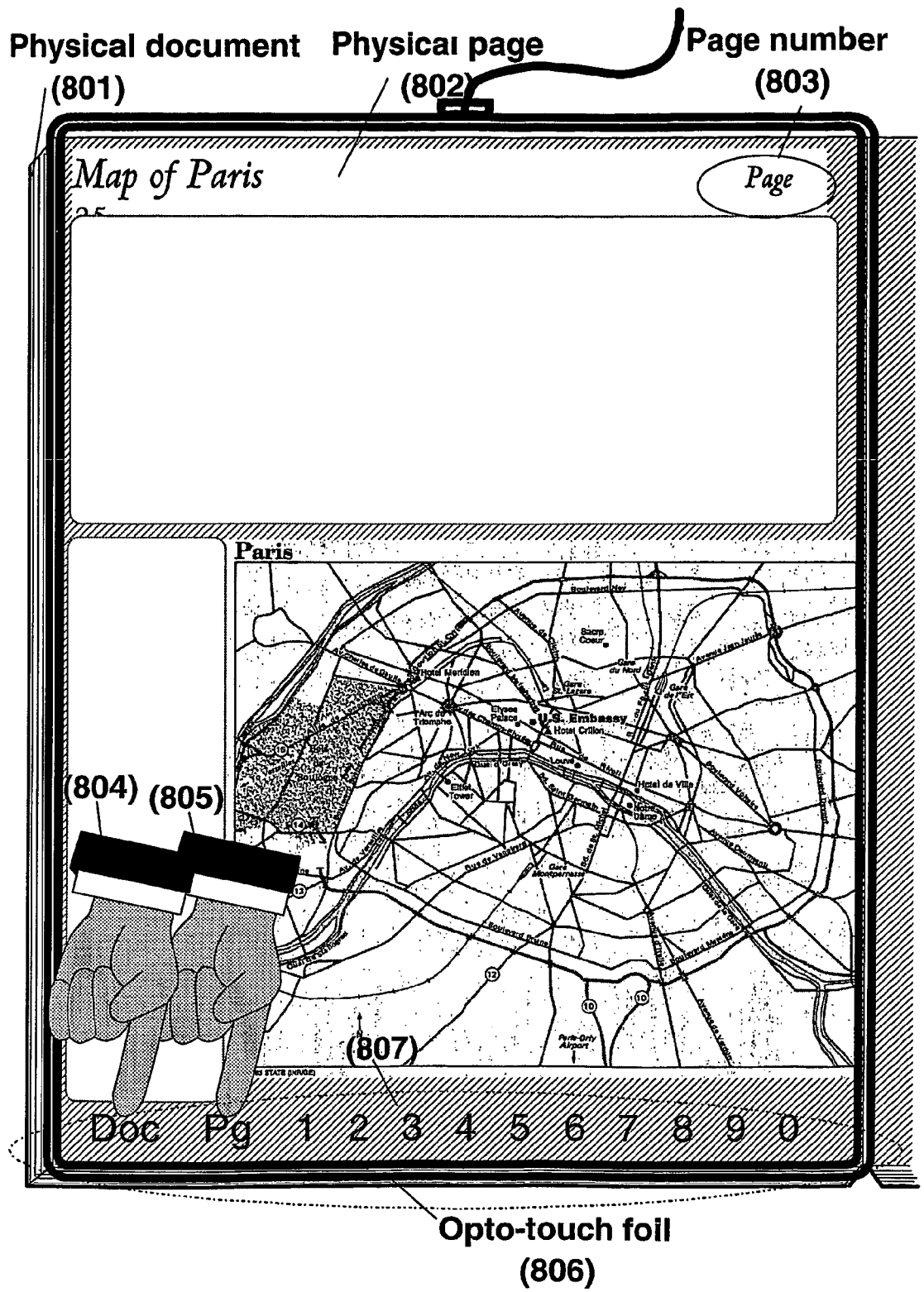
Fig. 8: The user enters documents and pages numbers on the opto-touch foil

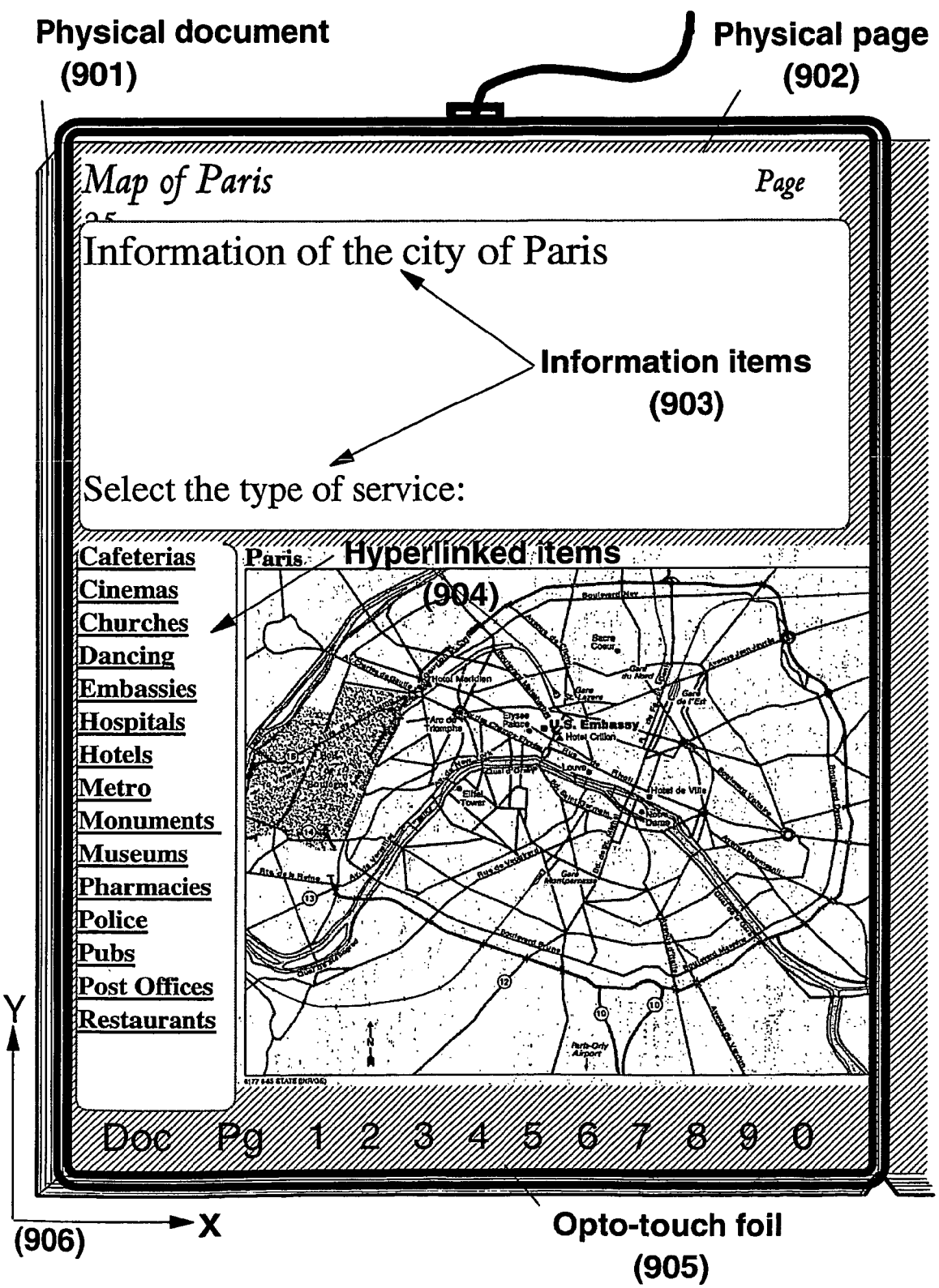
Fig. 9: Information of a page is retrieved and is displayed over the same page by the opto-touch foil

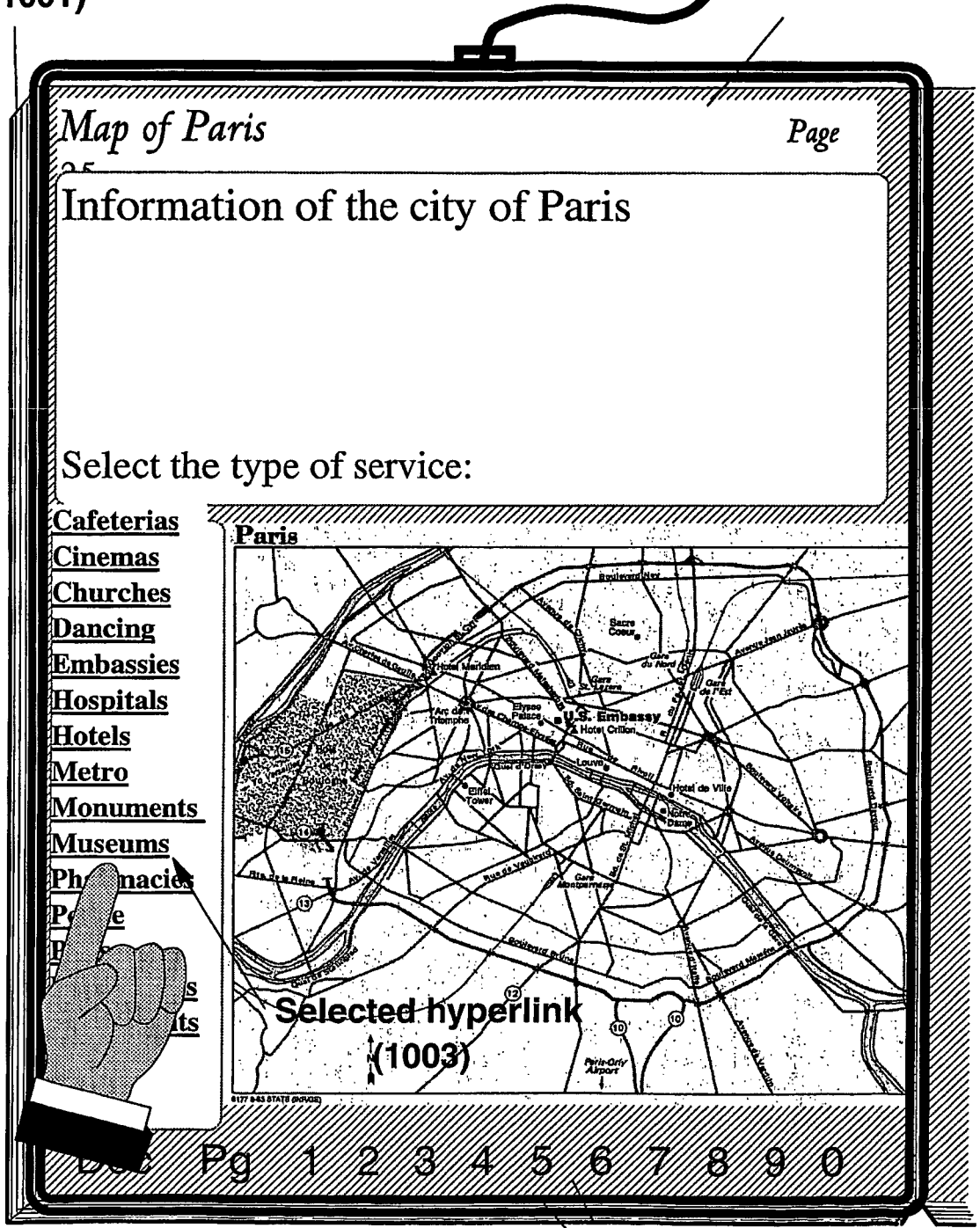
Fig. 10: The user activates an hyperlink by pressing the opto-touch foil over the selected item

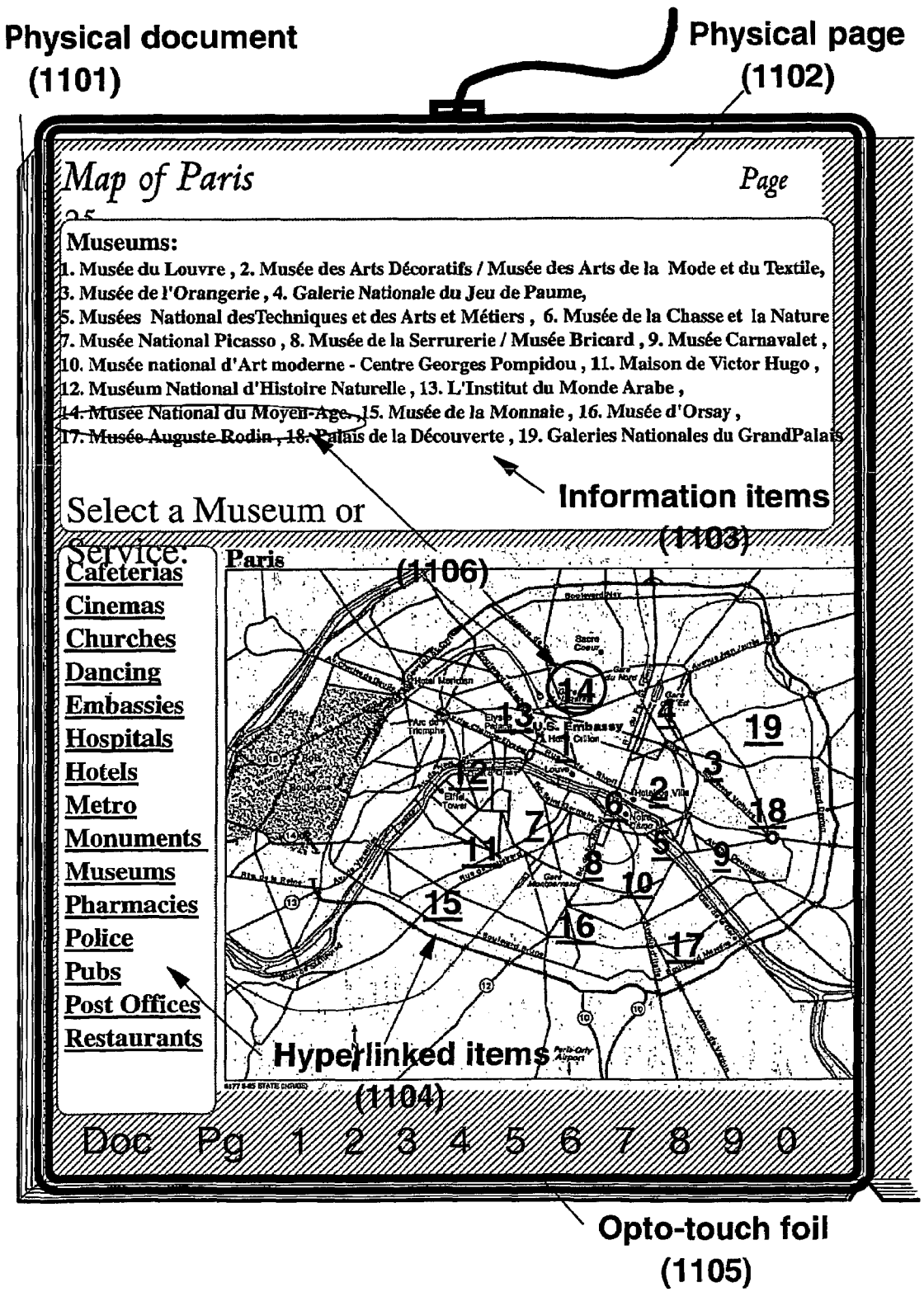
Fig. 11: Requested information is retrieved and is displayed over the page by the opto-touch foil.

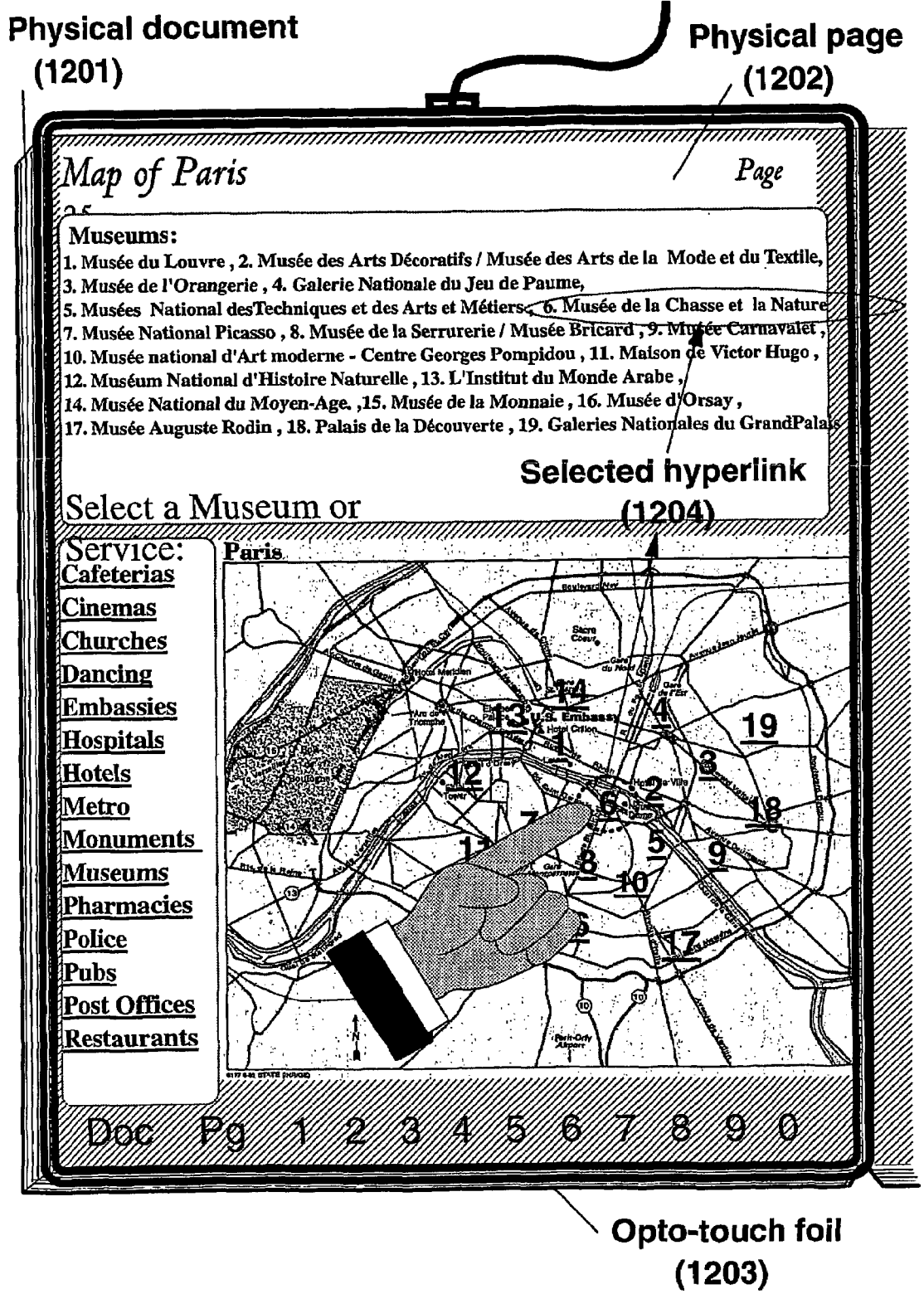
Fig. 12: The user activates another hyperlink by pressing the opto-touch foil over the selected item

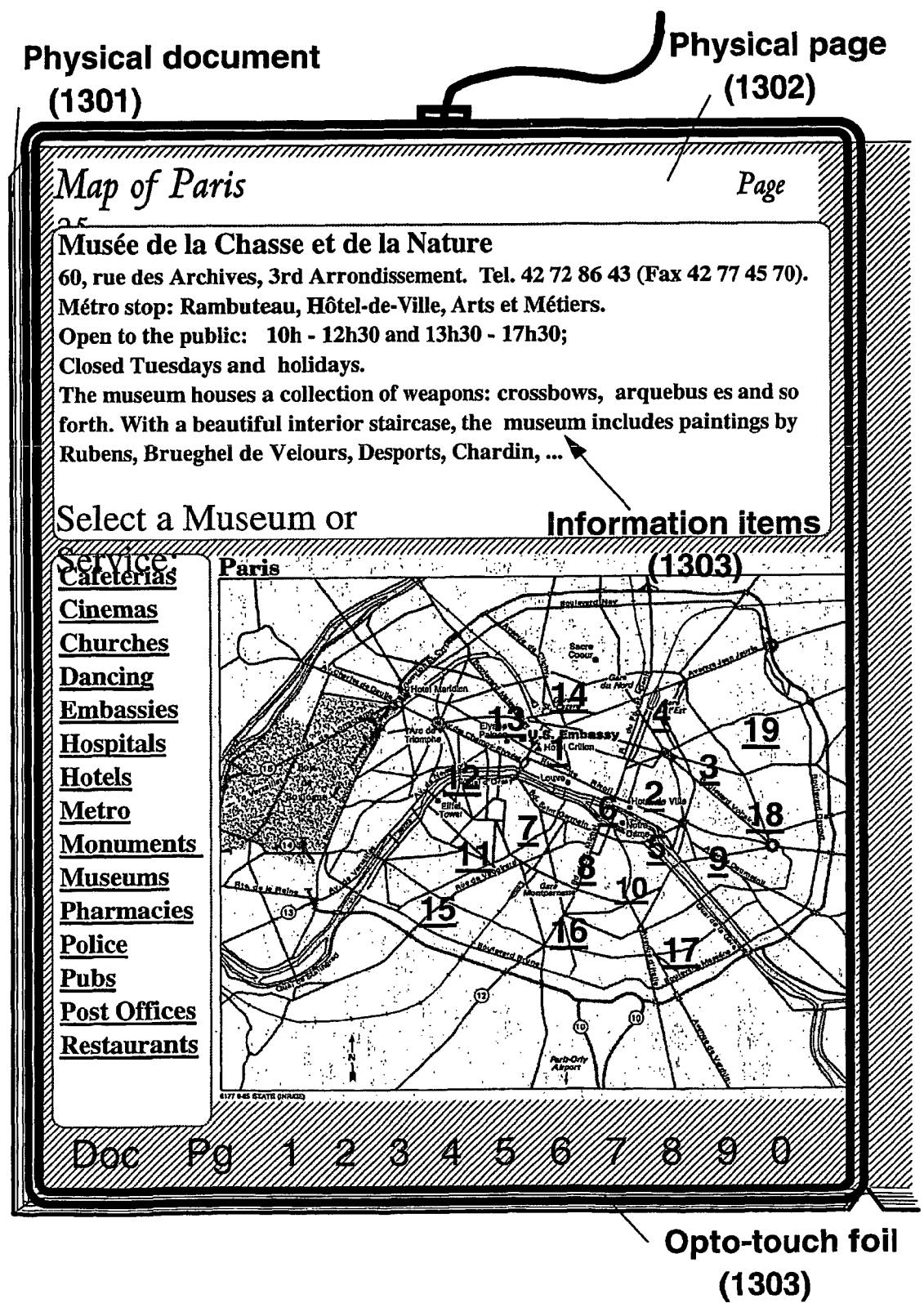
Fig. 13: Requested information is retrieved and is displayed over the page by the opto-touch foil.

SYSTEM AND METHOD FOR SELECTING ELECTRONIC DOCUMENTS FROM A PHYSICAL DOCUMENT AND FOR DISPLAYING SAID ELECTRONIC DOCUMENTS OVER SAID PHYSICAL DOCUMENT

RELATED APPLICATION

This application is a national stage application of and claims priority from PCT Application PCT/EP02/11126, filed Sep. 12, 2002, which claims priority from European Application No. 01480109.6, filed Nov. 13, 2001. These disclosures are hereby incorporated by reference herein in their entireties. The above-referenced PCT International Application was published in the English language and has International Publication No. WO 03/042862 A2.

FIELD OF THE INVENTION

The present invention relates to computer interfaces and to new ways of enhancing paper-based information with electronic information. More particularly, the present invention relates to a system and a method for using physical documents as interfaces for navigating on a network and browsing hypertext documents (i.e., documents that may contain hyperlinks to other documents).

BACKGROUND OF THE INVENTION

During the last years, due mainly to the widespread use of personal computers and the universal access of millions of users to the World Wide Web, "multimedia publishing" has veritably exploded. Due to the widespread penetration of CD-ROM drives an enormous amount of multimedia titles combining text, images and sounds, are now accessible to owners of personal computers. Interactive electronic services, video-on-demand, and the World Wide Web are providing access to an increasing offering of movies, shopping information, games, multimedia documents, electronic commerce and many other services. In this evolution, an incredible amount of hypermedia information is today accessible via the Internet on the World Wide Web.

Notwithstanding the restless progress in computer technology, electronic recording, processing and displaying of data, multimedia and the Web, the use of paper has not been reduced. In fact, today, most information that people continues to read and consult every day is hard-copied, printed or written information, not electronically stored and displayed information.

Even when the public's enthusiasm for new computer-based multimedia services has been seen by many analysts as a threat to the conventional forms of hard-copied publishing, particularly book publishing, the reality is that reading a book cannot be compared with reading electronic media. Even when many electronic systems attempt to replace paper by providing many advantages such as, for example, a better access to multimedia services, reading paper remains today preferable for most people, whether they are familiar with computers or not. It is difficult to foresee the replacement in the future, of paper books by electronic books (e-books) or the realization of a truly "paper-less" office.

People usually prefer to read and browse through paper catalogs, magazines, newspapers, maps and books by flipping through the pages and glancing at pictures and text. A collection of printed color photographs can be much easily and quickly browsed than a sequence of computer screens.

On publication entitled *"The Last Book"*, IBM Systems Journal, Vol 36, No. 3 Vol 36, No. 3-1997, by J. Jacobson, B. Comiskey, C. Turner, J. Albert, and P. Tsao of the MIT Media Laboratory, printed books and computer screens are compared in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

For people, paper has many advantages; paper is portable, familiar and easily distributed; paper can be easily viewed, marked, or manipulated, and does not require energy source to display. The friendliness, usefulness and availability of hard-copy documents cannot be reproduced today with electronic documents.

However, the most important problem, of course, with printed books is that, traditionally, they cannot easily be changed, amended, updated nor completed.

To make additional information directly accessible from printed publications, U.S. patent application Ser. No. 09/841930 (IBM's reference FR9-2000-0022), entitled "Method and system for accessing interactive multimedia information or services by touching highlighted items on physical documents" discloses a system and method for selecting and accessing multimedia information and/or services located on a user workstation (or on one or a plurality of servers connected to a communication network) simply by touching with a finger, items (words, letters, symbols, pictures, icons, . . . ) that are electronically illuminated over the surface of a hard-copy document (or any other physical surface) by means of an opto-touch foil. The referenced system includes:

an opto-touch foil preferably transparent, placed by the user over (or under) the document (or a portion of said document). This opto-touch foil is used:
to illuminate and highlight hyperlinked items over the surface of the physical document (or portion of this document), and
to read coordinates of these hyperlinked items,
an user workstation for accessing and displaying the information and/or the service associated with the hyperlinked items.

The hyperlinked items are identified by means of a luminous signal (or light spot) generated by the opto-touch foil. The opto-touch foil operates under the control of the user workstation. Illuminated items are selected by pressing the opto-touch foil. When the user selects an item among all illuminated items, the user workstation receives from the opto-touch foil a signal indicating the position of this selected item. The user workstation identifies and locates referring to a hyperlink table the information and/or the service associated with the position of the selected item. If the information and/or service is located in a remote server, a request is sent to this server. If the information and/or the service is stored in the user workstation, then this information and/or service is accessed locally.

The information and/or service is then retrieved and displayed on a separate display, but not over the document to which this information is related. Thus, even if the information associated with illuminated items is selected from the physical document, this information is shown to the user on a separate media, generally on the user's workstation display, but not over the same document. Thus, the user is forced to frequently to move his head and to change eyes focus, going forward and backwards from the physical document to the workstation display and vice versa. This process is detrimental for the best user's comfort, rest, and attention.

Using the same opto-touch foil, U.S. patent application Ser. No. 09/892399 (IBM's reference FR9-2000-0027), entitled "System and method for locating on a physical document items referenced in a electronic document", discloses a method and system for using the same opto-touch foil for locating on a physical document items referenced in an electronic document. In a preferred embodiment, this invention enables to highlight on a paper map the geographic position of places referenced in a Web page.

Also, using opto-touch foils, U.S. patent application Ser. No. 09/923150 (IBM's reference FR9-2000-0039), entitled: "System and method for locating on a physical document items referenced in another physical document", discloses a method and system for creating hyperlinks from items (e.g. words, pictures, foot notes, symbols, icons) on a first physical document to particular points on a second physical document (manuscript or printed document), for activating these hyperlinks simply by touching the first document, and for highlighting, by means of a light emitting source, the position of the items on the second document. In a preferred embodiment, the invention enables to highlight on a hard-copy map the geographic positions of places referenced in a hard-copy document.

These patent applications are limited to show the positions of items referenced on electronic or physical documents, as being simple light spots over paper maps.

The herein above cited reference, *"The Last Book"*, IBM Systems Journal, Jacobson et al., describes the possibility of what might be considered an "animated" book:

"Finally, a remark should be made about the changing entity of the book itself. A medieval religious book, for instance, is immediately identified from the thick, black, Gothic lettering invented during the time of Charlemagne. Similarly, the richly drawn first letter of the Beatus page or the poetic layout of almost any book typeset by the inventor of the modem portable book, Aldus Manutius, is easily identified . . . . Thus the book on Arabian horse genetics may have video clips showing the performance of certain classes of horses. The key is that the video clip resides, spatially mapped, to a particular page in a particular book sitting on our shelf. It has a particular spatial place where we know we can find it. Contrast this with the single monitor we now have on the desktop, through which all changeable images must come, and the idea of the animated manuscript is clear".

This is a quote from Dr. James Sheats, in the article entitled: *"Introduction to Organic Light-Emitting Diodes (OLEDs)"*, on the rolltronics.com Internet site:

"The effects of the electronics and photonics revolutions, enabled by the silicon-based transistor (and its incorporation into integrated circuits), fiber optics, and solid state lasers, are evident in almost every aspect of modem commerce. Yet, far from saturating the market, these devices are predicted to proliferate far beyond anything we have imagined so far. Whereas roughly 50% of households in the developed countries own one personal computer, industry leaders today predict that in the next decade or so we will all own dozens or even hundreds of computers (most of them embedded in information appliances), all of which will communicate with each other on a network similar to the Internet. We will not know where these computers are, nor will we care, as long as they carry out their functions.

In this new world of "pervasive computing" (a term coined by Joel Birnbaum of Hewlett-Packard Labs), in which most computing is carried out by distributed resources connected by a utility-like network, the user's awareness of a "computer" lies only in what he or she sees at the interface: the display and input devices. Displays, now considered a "peripheral," will be the central object from the user's perspective, while the processor becomes peripheral. This vision, however, requires displays that are far different from the current cathode ray tubes and expensive (and slow) liquid crystals, since they must be numerous, compact, and portable. Today display technology is primitive compared to computing technology. Indeed, paper is the preferred medium, resulting in the opposite of the early vision of the "paperless office."

Therefore, today there is a need to provide users with new systems and methods for improving physical documents with information in the form of electronic graphics, images and/or text that could be displayed in context, over said physical documents.

The present invention discloses how new display technologies, such as those based on passive matrix, transparent, organic electroluminescence (EL) devices (TOLEDS) and EL polymers, that are broadly available today, can be integrated with other technologies, like touch-foil technologies, and can be used to transform fixed, static, hard-copy documents into dynamic, animated, changeable, sources of information.

OBJECTS OF THE INVENTION

It is a broad object of the present invention to expand and complement the information content of physical documents by electronic means.

It is another object of the present invention to select and access electronic documents directly from physical documents and to display said accessed electronic documents over the same physical documents.

It is another object of the present invention to use physical documents as interfaces for navigating in a network and browsing hypertext documents.

SUMMARY OF THE INVENTION

The present invention discloses a system and a method for selecting, accessing and retrieving directly from a physical (i.e., hard-copy) document, hypertext documents located on a user workstation or on one or a plurality of servers connected to a communication network, and for displaying the retrieved hypertext documents over said physical document. The information is accessed by the user simply by touching with a finger items (i.e., words, letters, symbols, pictures, icons, . . . ) that are highlighted on an electronic hypertext document displayed over the physical document.

As defined in independent claims, the present invention is directed to a system and method for selecting electronic information from a physical document, and for displaying said selected electronic information over this physical document. This method, for use in a user system comprises the steps of:

identifying a physical document, this physical document comprising one or a plurality of pages;

identifying a page of said physical document;

identifying and locating an electronic document associated with the identified page referring to a document hyperlink table; said document hyperlink table comprising for each page of the physical document the identification and location of an electronic document;

accessing and retrieving the electronic document associated with the identified page;

displaying the retrieved electronic document by means of an opto-touch foil placed over the identified page.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows the main components of the invention.

FIG. 2 shows the internal structure of an opto-touch foil.

FIG. 3 shows the steps of the method for hyperlinking a physical document to hypertext documents displayed over said physical document.

FIG. 4 shows the steps of the method for selecting, accessing and displaying hypertext documents on physical documents.

FIG. 5 shows a physical (i.e., a hard-copy) document.

FIG. 6 shows a page of a physical document.

FIG. 7 shows how an opto-touch foil is placed aligned over a page of a physical document.

FIG. 8 shows how a user enters a document number and pages numbers by means of sensitive touch buttons located on the opto-touch foil.

FIG. 9 shows how information related to a selected page of physical document is retrieved and displayed over the selected page by means of the opto-touch foil.

FIG. 10 shows how a user activates an hyperlink by pressing the opto-touch foil over a selected illuminated item.

FIG. 11 shows how the requested information is received and displayed by the opto-touch foil over the page of the physical document.

FIG. 12 shows how a user activates another hyperlink by pressing the opto-touch foil over a new selected illuminated item.

FIG. 13 shows how the new requested information is received and displayed by the opto-touch foil over the page of the physical document.

PREFERRED EMBODIMENT OF THE INVENTION

The present invention discloses a system and a method for selecting, accessing and retrieving directly from a physical (i.e., from hard-copy) document, electronic hypertext documents located on a user workstation or on one or a plurality of servers connected to a communication network, and for displaying the retrieved electronic hypertext documents over this physical document. To select and to get access to additional information, the user simply touches with a finger, items (i.e., underlines, words, letters, symbols, pictures, icons, . . . ) that are highlighted on an electronic hypertext document displayed over the physical document.

The system includes:

a transparent opto-touch foil, placed by the user over the physical document (or over a portion of said physical document). This opto-touch foil is used:

to display hypertext documents over the surface of the physical document (or over a portion of the physical document);

to highlight hyperlinked items comprised in displayed hypertext documents;

to sense the coordinates of hyperlinked items selected by the user;

a user workstation for accessing hypertext documents associated with selected hyperlinked items and for sending received hypertext documents to the opto-touch foil for visualization.

The opto-touch foil operates under the control of the user workstation. An hypertext document comprising hyperlinked items is displayed over a physical document by means of the opto-touch foil, Hyperlinked items are highlighted to be easily identified. The user selects an highlighted item simply by pressing the opto-touch foil. When an item is selected among all highlighted items, the user workstation receives from the opto-touch foil a signal indicating the position of this selected item. The user workstation identifies and locates the address of the hypertext document associated with the position of the selected item.

If the hypertext document is located in a remote server, a request is sent to this server.

If the hypertext document is stored in the user workstation, then the hypertext document is accessed locally.

When the selected hypertext document is received, the user workstation ores it and controls its display by the opto-touch foil.

System for Selecting, Accessing and Displaying Electronic Documents over Physical Documents As shown in FIG. 1, the system according to the present invention comprises:

(101) A physical (hard-copy) document (e.g., a book) comprising one or a plurality of pages.

(102) An opto-touch foil connected to a user workstation. The opto-touch foil is placed over a page (or a portion) of the document.

(103) A user workstation (preferably connected to a communications network) for accessing hypertext documents associated with selected hyperlinked items and for sending received hypertext documents to the opto-touch foil for visualization.

Physical Document

Physical documents (101) can be of any kind. They can be, for instance, geographic maps (e.g., topographical maps, political maps, historical maps, route maps, shaded relief maps, city maps, natural resources maps, rail road maps or even any other type of map), novel books, text books, technical plans, commercial catalogs or even any other type of hard-copy, engraved, written, or printed surfaces (e.g., paintings in a museum of art). The material of the physical documents can be paper, plastic, wood or any other material.

Opto-Touch Foil

In a preferred embodiment, the opto-touch foil (102) comprises two, functionally independent, transparent foils, namely:

a touch foil, and
a light emitting foil (opto foil).

FIG. 2 shows the cross section of an opto-touch foil (200) comprising:

a transparent resistive or capacitive touch foil (201), of the type used commonly to manufacture touch screens. The generated signal is generally proportional to the coordinates (X, Y) of the point that is pressed or touched (203), a transparent light emitting foil (202), which is a transparent, bright, self-emitting display that can emit light (204) from either one or both surfaces.

The combination of both foils (i.e., the touch foil stacked over the light emitting foil) forms an opto-touch foil (200). FIG. 2 represents an opto-touch foil placed and aligned over a physical document (205) comprising a plurality of items (206) (i.e., words, pictures, icons, etc.) printed (or written, painted, engraved . . . ) on its surface.

The opto-touch foil may communicate (106) with the user workstation (103) over an infrared link, a serial wired connection or any other communication means (e.g. by means of a wireless connection operating in the globally available 2.4 Ghz band of the "Bluetooth" specification, as promoted by the "Bluetooth Special Interest Group" and documented on the Official Bluetooth Website.

Transparent Touch Foil Technology

According to one aspect of the present invention, the touch foil component (201) may be made of transparent resistive or capacitive films of the type used commonly to manufacture touch screens. The generated signal is generally proportional to the coordinates of the point pressed. One example of touch foil technology it would be possible to use, is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company.

TouchTek4 touchscreens are commonly used today, in handheld personal information management systems, PDAs, mobile computing systems, automotive, diagnostics and telecom devices, and Internet appliances. TouchTek4 touchscreens are engineered to accept more than three million touches on any area of the screen.

Transparent Light-Emitting Foil Technology

According to another aspect of the present invention, the transparent light-emmiting foil (202) may commonly include a substrate having an array comprising a plurality of transparent scanning lines, transparent data lines crossing said scanning lines, and electro-luminiscent (EL) elements (pixels) on the intersections of the scanning and data lines. With today's technology, this passive-matrix, light-emitting display may be made of an array of TOLED's (Transparent Organic Light Emitting Devices) of the types used to create vision area displays on windshields, cockpits, helmets and eyeglasses.

In its most basic form, a TOLED is a monolithic, solid-state device consisting of a series of "small molecule" organic thin films sandwiched between two transparent, conductive layers. When a voltage is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light. As a result, TOLEDs are bright, self-emitting displays that can be directed to emit from either or both surfaces. This is possible because, in addition to having transparent contacts, the organic materials are also transparent over their own emission spectrum and throughout most of the visible spectrum.

TOLED displays are today manufactured with standard silicon semiconductors. Since TOLEDs are thin-film, solid-state devices, they are very thin, lightweight and durable, ideal for portable applications, like the one disclosed in this invention. TOLEDs can be bottom, top, or both bottom and top emitting. Also, TOLEDs technology has attractive advantages regarding, transparency (TOLED displays can be nearly as clear as the glass or substrate they're on and when built between glass plates, TOLEDs are >85% transparent when turned off), energy efficiency (for longer battery life), full viewing angle, bright and high contrast light emission, fast response time, and environmental robustness. Thus, TOLEDs are well suited for manufacturing the light-emitting, electro-luminiscent, display component, used jointly with the transparent touch foil (201) according to the present of this invention.

One example of light emitting foil technology it would be possible to use is the technology used for the TOLEDs manufactured by UNIVERSAL DISPLAY Corporation, fully described in the Web site of UNIVERSAL DISPLAY Corporation.

User Workstation

The user workstation (103) is used to control the selection, access and retrieval of hypertext documents, stored locally or located on one or a plurality of servers connected to the network, and to control the display of received electronic documents by the opto-touch foil. The user workstation include means for requesting, receiving and storing hypertext documents, for receiving the coordinates of the points pressed by the user on the opto-touch foil (102), for identifying the hyperlink addresses associated with the points pressed, and for controlling the display by the opto-touch foil (102) of the received hypertext documents.

The user workstation can be a Personal Computer, an Internet enabled cell phone, a PDA (Personal Digital Assistant), an onboard computer, a network computer, an Internet appliance or a wireless IP enabled device, connected to the opto-touch foil (102). The opto-touch foil (102) may communicate with the user workstation by means of a cable (106), a wire pair, an infrared link, or a wireless radio link.

In a particular embodiment, the user workstation is connected to the Internet network (104) and comprises a Web Browser application. Servers are Web servers (105) and the hypertext documents are HTML Web pages. Said HTML Web pages are displayed by the opto-touch foil (102) over the physical document (101). They are selected by pressing the opto-touch foil (102) on highlighted items.

Method for Creating Hyperlinks from a Physical Document to Hypertext Documents

As shown in FIG. 3, the method for creating hyperlinks from a hand written or printed document (like the document shown in FIG. 5 entitled *"Interactive Maps of World Cities"*), to a plurality of servers to access electronic documents to be displayed over this physical document, comprises the steps of:
- (301) assigning a reference number (document identifier) to the physical document;

for each page of the physical document from which the user desires to create hyperlinks, to access and display hypertext documents:
- (302) selecting a page of the physical document;
- (303) defining the address of an hypertext document. This hypertext document will be automatically accessed and displayed by the opto-touch foil when the user will select this page;

and, for each hypertext document, that the user desires to display over this page:
- (304) editing and formatting the hypertext document so that information can be displayed, with the layout required, over the page of the physical document, by the opto-touch foil;
- (305) loading the hypertext document on the corresponding server.

(301) Assigning a Reference Number to the Document

As shown in FIG. 5, for each document (501) he receives, the user:

assigns a reference number (502) to this document (e.g., 387) for identifying said document.

writes this reference number (502) on the document, and creates a Document Hyperlink Table, associated with the document and accessible from the user workstation, said Document Hyperlink Table comprising the reference number of the document and other relevant information related to the document such as title, author, ISBN (International Standard Book Number), URL of publisher's Web page, date, etc . . . The hyperlink table may be stored within the user workstation or may be stored in an external memory accessible from the user workstation.

The header of the new created Document Hyperlink Table associated with the document shown in FIG. 5, can be built as follows:

| Doc: 0387 | Title: "Interactive Maps of World Cities" | Author: David Nash Ford, Editor Binfield, Berkshire, UK |
|---|---|---|
| URL: http://interactivecities.com | Date: 28 Jan. 2001 | ISBN: 96-375-0556-2 |
| Page: | Link: | URL: |

For each page of the physical document from which it is desired to create hyperlinks, for accessing and displaying hypertext documents:

(302) Selecting a Page, and (303) Defining the Address of an Hypertext Document

As shown in FIG. 6, each time the user wants to create one or a plurality of hyperlinks from a page (602) of the physical document (601) to one or a plurality of electronic hypertext documents, he:

selects a page of the document;

enters in the Document Hyperlink Table, means for identifying said page (preferably a page number, e.g., 25) (603);

associates an hypertext document with this page. The user selects the destination address (e.g., http://www.world-cities.com/Paris.html) of the hypertext document. This destination address identifies, within the communication network, a server and, within this server, the hypertext document that must be automatically accessed and displayed over the page, when this page is selected by the user;

enters this destination address (an URL address for example) in the document Hyperlink Table.

In a preferred embodiment, using the herein described method for hyperlinking the different pages (602) of a same document (601), the Document Hyperlink Table would appear like this:

| Doc: 0387 | Title: "Interactive Maps of World Cities" | Author: David Nash Ford, Editor Binfield, Berkshire, UK |
|---|---|---|
| Publisher/Series URL: http://interactivecities.com | Date: 28 Jan. 2001 | ISBN: 96-375-0556-2 |
| Page: | Link: | URL: |
| 1 | "Map of Amsterdam" | http://www.worldcities.com/Amsterdam.html |
| 2 | "Map of Berlin" | http://www.worldcities.com/Berlin.html |
| . | . | . |
| . | . | . |
| . | . | . |
| 24 | "Map of Padua" | http://www.worldcities.com/Padua.html |
| 25 | "Map of Paris" | http://www.worldcities.com/Paris.html |
| 26 | "Map of Praga" | http://www.worldcities.com/Praga.html |
| . | . | |
| . | . | |
| . | . | |
| 173 | "Map of Wichita" | http://www.worldcities.com/Wichita.html |

The Document Hyperlink Table may be stored locally in the user workstation (103) or well it may be remotely stored on a Web server (105) accessible through the Internet network (104) from the user workstation.

(304) Editing and Formatting Hypertext Documents Accessible from the Page

As shown by FIG. 9, the information (903), (904) comprised in the hypertext documents that can be accessed from a particular page (902) of a physical document (901), must conform with the layout required so that this information when displayed by the opto-touch foil (903)(904), appears to the user correctly aligned and distributed over the physical page (902).

To that aim, the hypertext documents must be edited and formatted beforehand over the layout of the physical page. In practice this can be done, for example, by editing these hypertext documents over a digitized copy (e.g., over a full size scanned copy) of the physical page (902).

(305) Loading Hypertext Documents on the Corresponding Server

Once edited and formatted, hypertext documents related to (i.e., hyperlinked) a physical page (602) are loaded on servers (105) at corresponding hyperlink addresses. The hypertext documents are accessed on this servers and retrieved by the user workstation (103) before being displayed over the physical page by the opto-touch foil (102).

Method for Selecting, Accessing and Displaying Hypertext Documents over a Physical Document The user receives a hand written or printed document, like the document entitled *"Interactive Maps of World Cities"*, (Doc: 387) shown in FIG. 5. Hyperlinks have been previously defined from selected pages of this physical document (101) to hypertext documents located on servers (105) connected to a communication network (104).

As shown in FIG. 4, the method for selecting, accessing and retrieving hypertext documents from a page of a physical document, and for visualizing these hypertext documents over this physical page, comprises the steps of:

(401) selecting a physical document;
(402) selecting a page of this physical document;
(403) placing and aligning the opto-touch foil over the selected page;
(404) identifying in the Document Hyperlink Table the address of the hypertext document associated with the selected page;
(405) accessing and retrieving this hypertext document;
(406) displaying by means of the opto-touch foil, the retrieved hypertext document over the selected page of the physical document;
(407) building a Page Hyperlink Table from this hypertext document;
(408) selecting an hyperlinked item by pressing the opto-touch foil over this item;
(409) determining the position on the opto-touch foil, of the selected hyperlinked item;
(410) identifying the address of the selected hypertext document in the Page Hyperlink Table.

(401) Selecting a Physical Document

By means of any user interface (keyboard, mouse, touch screen, . . . ) or any reading means (bar code reader . . . ), the user enters the reference number (identifier) of the document (e.g.: document 387) he wants to select. In the particular embodiment shown in FIG. 8, the user enters the reference number of the document (e.g.: Doc: 387) by means of an array of pressure sensible "touch buttons" (807) printed on the bottom of the opto-touch foil. The user presses (804) in the following order:

a touch button marked "Doc, and then
numerical touch buttons corresponding to each digit of the document reference number (e.g., "3", "8" and "7").

This operation gives access to the Document Hyperlink Table associated with the selected document. In the case of the exemplary document shown in FIG. 5, the Document Hyperlink Table would be like this:

| Doc: 0387 | Title: "Interactive Maps of World Cities" | Author: David Nash Ford, Editor Binfield, Berkshire, UK |
|---|---|---|
| Publisher/ Series URL: http://interactivecities.com | Date: 28 Jan. 2001 | ISBN: 96-375-0556-2 |

| Page: | Link: | URL: |
|---|---|---|
| 1 | "Map of Amsterdam" | http://www.worldcities.com/Amsterdam.html |
| 2 | "Map of Berlin" | http://www.worldcities.com/Berlin.html |
| . | . | . |
| . | . | . |
| . | . | . |
| 24 | "Map of Padua" | http://www.worldcities.com/Padua.html |
| 25 | "Map of Paris" | http://www.worldcities.com/Paris.html |
| 26 | "Map of Praga" | http://www.worldcities.com/Praga.html |
| . | . | |
| . | . | |
| 173 | "Map of Wichita" | http://www.worldcities.com/Wichita.html |

(402) Selecting a Page of this Physical Document

The user goes to a page of the document (e.g.: page shown in FIG. 6), and, by means of any user interface (keyboard, mouse, touch screen . . . ) or any reading means (bar code reader . . . ), enters the page number (603) of the document he wants to select. In the particular embodiment shown in FIG. 8, by means of the array of pressure sensible touch buttons (807) printed on the bottom of the opto-touch foil (806), the user enters the page number to select (e.g.: Pg. 25). The opto-touch foil can be on any position (normally the opto-touch foil is placed over the selected page). The user presses (805) in the following order:

a touch button marked as "Pg", and then
numerical touch buttons corresponding to each digit of the page number (e.g., "2" and "5" ) to select.

This procedure gives access to the entry (shown in reverse video) corresponding to the selected page (e.g., Pg. 25) within the Document Hyperlink Table associated with the selected document (e.g., Doc: 387).

| Doc: 0387 | Title: "Interactive Maps of World Cities" | Author: David Nash Ford, Editor Binfield, Berkshire, UK |
|---|---|---|
| Publisher/ Series URL: http://interactivecities.com | Date: 28 Jan. 2001 | ISBN: 96-375-0556-2 |

| Page: | Link: | URL: |
|---|---|---|
| 1 | "Map of Amsterdam" | http://www.worldcities.com/Amsterdam.html |
| 2 | "Map of Berlin" | http://www.worldcities.com/Berlin.html |
| . | . | . |
| . | . | . |
| . | . | . |
| 24 | "Map of Padua" | http://www.worldcities.com/Padua.html |
| 25 | "Map of Paris" | http://www.worldcities.com/Paris.html |
| 26 | "Map of Praga" | http://www.worldcities.com/Praga.html |
| . | . | |
| . | . | |
| 173 | "Map of Wichita" | http://www.worldcities.com/Wichita.html |

The Document Hyperlink Table is either stored locally in the user workstation, or is retrieved from a remote server and then stored locally in the user workstation or is stored in a remote server and is accessed remotely.

(403) Placing and Aligning the Opto-Touch Foil Over the Selected Page

As shown in FIG. 7, once a physical document (701) and a page (702) have been selected, the opto-touch foil (703) is:

placed over the page, and aligned (704) with the borders of the selected page by some conventional means (e.g., by adjusting the lower left corner of the touch foil with the lower left corner of the page).

(404) Identifying in the Document Hyperlink Table the Address of the Hypertext Document Associated with the Selected

The Document Hyperlink Table comprises for each hyperlinked page of the physical document, the location within the network of the hypertext document that must be automatically accessed when the page is selected by the user. The hyperlinked hypertext document may be identified by means of a destination address. In the Internet network, Web pages in Web Servers are identified by an URL (Uniform resource Locator).

In our example, the Document Hyperlink Table associates the "Page 25", with the hyperlink named: "Map of Paris" located at the URL: http://www.worldcities.com/Paris.html.

(405) Accessing and Retrieving this Hypertext Document

The user workstation (103) activates the hyperlink (destination address, URL, . . . ) of the selected hypertext document.

In our example, the hyperlink labeled "Map of Paris" is activated, and the hypertext document at the URL: http://www.worldcities.com/Paris.html is accessed through the network and retrieved by the user workstation.

(406) Displaying the Hypertext Document Over the Page of Physical Document

As shown by FIG. 9, the information (903) (904) comprised in the received hypertext document is displayed over the page (902) of the physical document (901), under the control of the user workstation.

In the particular embodiment of the invention shown in FIG. 9, items, in the displayed hypertext document, that are merely informative (903) are shown using normal characters, while items, that are hyperlinked (904) to additional information, are shown underlined. In an alternate embodiment, hyperlinked items can be displayed by the opto-touch foil, for instance, in reverse video.

(407) Building a Page Hyperlink Table from this Hypertext Document

As illustrated in FIG. 9, the received hypertext document can also contain hyperlinks (904) to other hypertext documents. To select and get access from this physical page (902) to these hyperlinked documents, a Page Hyperlink Table is built on the user workstation, from information comprised in the received hypertext document. Basically, the information of hyperlinks that are encoded on the received hypertext document, is first copied into this table. Then, the opto-touch foil coordinates (X,Y) (906) of the hyperlinked items (as they are displayed by the opto-touch oil), are computed and are copied into the corresponding entries of the Page Hyperlink Table.

In the example shown in FIG. 9, the Page Hyperlink Table corresponding to the displayed hypertext document would be like this:

| Doc: 0387 PAGE: 25 | | Title: "Interactive Maps of World Cities" | Author: David Nash Ford, Editor Binfield, Berkshire, UK |
|---|---|---|---|
| (X, Y): | | Link: | URL: |
| 5 | 150 | "Cafeterias" | http://www.worldcities.com/Paris/Cafeterias.html |
| 5 | 140 | "Cinemas" | http://www.worldcities.com/Paris/Cinemas.html |
| 5 | 130 | "Churches" | http://www.worldcities.com/Paris/Churches.html |
| 5 | 120 | "Dancing" | http://www.worldcities.com/Paris/Dancing.html |
| 5 | 110 | "Embassies" | http://www.worldcities.com/Paris/Embassies.html |
| 5 | 100 | "Hospitals" | http://www.worldcities.com/Paris/Hospitals.html |
| 5 | 90 | "Hotels" | http://www.worldcities.com/Paris/Hotels.html |
| 5 | 80 | "Metro" | http://www.worldcities.com/Paris/Metro.html |
| 5 | 70 | "Monuments" | http://www.worldcities.com/Paris/Monuments.html |
| 5 | 60 | "Museums" | http://www.worldcities.com/Paris/Museums.html |
| 5 | 50 | "Pharmacies" | http://www.worldcities.com/Paris/Pharmacies.html |
| 5 | 40 | "Police" | http://www.worldcities.com/Paris/Police.html |
| 5 | 30 | "Pubs" | http://www.worldcities.com/Paris/Pubs.html |
| 5 | 20 | "Post Offices" | http://www.worldcities.com/Paris/Post-Offices.html |
| 5 | 10 | "Restaurants" | http://www.worldcities.com/Paris/Restaurants.html |

(408) Selecting an Hyperlinked Item by Pressing the Opto-Touch Foil Over this Item

As shown in FIG. 10, the user selects an hyperlinked item (1003) ("Museums") on the page (1002) by pressing (e.g., by means of his fingertip) the opto-touch (1004) foil on this underlined illuminated word.

(409) Determining the Position of the Point Pressed on the Opto-Touch Foil

The opto-touch foil (1004) sends a signal to the user workstation (103) to identify the selected item. This signal indicates the position on the page (1002) of the point that has been pressed by the user on the opto-touch foil. The generated signal is generally proportional to the coordinates (X,Y) of the point that has been pressed.

In our example, the opto-touch foil measures the position on the page of the point that has been pressed (near the underlined "Museums") by the user. The coordinates that are measured at this point are around X=5 and Y=60.

(410) Identifying the Address of the Selected Hypertext Document in the Page Hyperlink Table

The hyperlinked item selected on the opto-touch foil (1004) by the user is identified thanks to the Page Hyperlink Table. This table comprises an indication of the position (coordinates X and Y) of the hyperlinked items comprised in the hypertext document that is displayed by the opto-touch foil over the page of the physical document.

In our example, the coordinates measured by the opto-touch foil (1004) are around (close to) X=5 and Y=60. They corresponds in the Page Hyperlink Table to the hyperlink named "Museums".

The user workstation Web activates the hyperlink (destination address, URL, . . . ) associated in the Page Hyperlink Table, with the identified selected item.

Once the position of the point pressed by the user is identified, the system searches in the Page Hyperlink Table what is the closest hyperlinked item coordinates. In our example, the hyperlink labeled "Museums" corresponding to the coordinates X=5, Y=60 is activated. Thus, in this example, a simple pressure near the underlined item "Museums" will automatically activate the following hyperlink on the Web: http://www.worldcities.com/Paris/Museums.html From this point, the steps (405), (406), (407), (408), (409) and (410) of the method can recursively be used to access, retrieve and display information hyperlinked to this page of the physical document.

In our example, FIG. 11 shows the information that is displayed by the opto-touch foil (1105) when the user activates the hyperlink associated with the word "Museums" displayed on the same opto-touch foil. This information is accessed through the network from the URL: http://www.worldcities.com/Paris/Museums.html and is retrieved by the user workstation. The displayed information comprises a numbered list of museums of the city of Paris (1103). The locations (1104) of the museums corresponding to the numerals in this list, are illuminated by the opto-touch foil over the (physical) map of Paris. Each illuminated numerals is underlined (e.g., 18) for indicating that this numeral is an hyperlink to another hypertext document. In the present example, each numeral on the map is related to a museum (1106) in the list (1103) and is hyperlinked to additional information concerning this museum.

To select on the physical page (1102) hypertext documents and to display these hypertext documents on the same physical page, a new Page Hyperlink Table is build from the received hypertext document on the user workstation. In the example shown in FIG. 11, the Page Hyperlink Table corresponding to the displayed hypertext document would be like this:

| Doc: 0387 PAGE: 25 | Title: "Interactive Maps of World Cities" | Author: David Nash Ford, Editor Binfield, Berkshire, UK |
|---|---|---|
| (X, Y) | Link: | URL: |
| 5   150 | "Cafeterias" | http://www.worldcities.com/Paris/Cafeterias.html |
| 5   140 | "Cinemas" | http://www.worldcities.com/Paris/Cinemas.html |
| 5   130 | "Churches" | http://www.worldcities.com/Paris/Churches.html |
| 5   120 | "Dancing" | http://www.worldcities.com/Paris/Dancing.html |
| 5   110 | "Embassies" | http://www.worldcities.com/Paris/Embassies.html |
| 5   100 | "Hospitals" | http://www.worldcities.com/Paris/Hospitals.html |
| 5   90 | "Hotels" | http://www.worldcities.com/Paris/Hotels.html |
| 5   80 | "Metro" | http://www.worldcities.com/Paris/Metro.html |
| 5   70 | "Monuments" | http://www.worldcities.com/Paris/Monuments.html |
| 5   60 | "Museums" | http://www.worldcities.com/Paris/Museums.html |
| 5   50 | "Pharmacies" | http://www.worldcities.com/Paris/Pharmacies.html |
| 5   40 | "Police" | http://www.worldcities.com/Paris/Police.html |
| 5   30 | "Pubs" | http://www.worldcities.com/Paris/Pubs.html |
| 5   20 | "Post Offices" | http://www.worldcities.com/Paris/Post-Offices.html |
| 5   10 | "Restaurants" | http://www.worldcities.com/Paris/Restaurants.html |

-continued

| 131 | 114 | "1. Musée du Louvre" | http://www.worldcities.com/Paris/Museums/001.html |
|---|---|---|---|
| 145 | 96 | "2. Musée des Arts Décoratifs/Musée des Arts de la Mode et du Textile" | http://www.worldcities.com/Paris/Museums/002.html |
| 162 | 110 | "3. Musée de l'Orangerie" | http://www.worldcities.com/Paris/Museums/003.html |
| 153 | 127 | "4. Galerie Nationale du Jeu de Paume" | http://www.worldcities.com/Paris/Museums/004.html |
| 149 | 107 | "5. Musées National desTechniques et des Arts et Métiers" | http://www.worldcities.com/Paris/Museums/005.html |
| 136 | 87 | "6. Musée de la Chasse et la Nature" | http://www.worldcities.com/Paris/Museums/006.html |
| 121 | 81 | "7. Musée National Picasso" | http://www.worldcities.com/Paris/Museums/007.html |
| 146 | 73 | "8. Musée de la Serrurerie/Musée Bricard" | http://www.worldcities.com/Paris/Museums/008.html |
| 158 | 99 | "9. Musée Carnavalet" | http://www.worldcities.com/Paris/Museums/009.html |
| 141 | 88 | "10. Musée national d'Art moderne-Centre Georges Pompidou" | http://www.worldcities.com/Paris/Museums/010.html |
| 110 | 72 | "11. Maison de Victor Hugo" | http://www.worldcities.com/Paris/Museums/011.html |
| 95 | 118 | "12. Muséum National d'Histoire Naturelle" | http://www.worldcities.com/Paris/Museums/012.html |
| 119 | 131 | "13. L'Institut du Monde Arabe" | http://www.worldcities.com/Paris/Museums/013.html |
| 125 | 149 | "14. Musée National du Moyen-Age" | http://www.worldcities.com/Paris/Museums/014.html |
| 77 | 62 | "15. Musée de la Monnaie" | http://www.worldcities.com/Paris/Museums/015.html |
| 149 | 55 | "16. Musée d'Orsay" | http://www.worldcities.com/Paris/Museums/016.html |
| 152 | 44 | "17. Musée Auguste Rodin" | http://www.worldcities.com/Paris/Museums/017.html |
| 189 | 93 | "18. Palais de la Découverte" | http://www.worldcities.com/Paris/Museums/018.html |
| 193 | 117 | "19. Galeries Nationales du Grand Palais" | http://www.worldcities.com/Paris/Museums/019.html |

FIG. 12, shows how the user (who is interested in receiving more information about the "Musée de la Chasse et la Nature"), selects the hyperlinked item (1204) (e.g.: the number "6") by pressing (e.g., by means of his fingertip) the opto-touch foil (1203) over it.

By pressing on this point, the opto-touch foil (1203) measures the position on the page of the point that has been pressed and sends a signal to the user workstation (103) to identify the selected item. This signal indicates the position on the page (1202) of the point that has been pressed (near the underlined number: "6") by the user on the opto-touch foil. In our example, the coordinates that are measured at this point are around X=136 and Y=87.

The hyperlinked item selected on the opto-touch foil (1203) by the user is identified thanks to the Page Hyperlink Table. In our example, since the coordinates measured by the opto-touch foil are around (close to) X=136 and Y=87, they corresponds in the Page Hyperlink Table to the hyperlink named: "6. Musée de la Chasse et la Nature".

The user workstation Web activates the hyperlink (destination address, URL, . . . ) associated in the Page Hyperlink Table with the selected hyperlink (i.e., "6. Musée de la Chasse et la Nature"). In our example, the following hyperlink on the Web is activated: http://www.worldcities.com/Paris/Museums/006.html FIG. 13 shows the information that is accessed through the network from the URL: http://www.worldcities.com/Paris/Museums/006.html, retrieved by the user workstation and displayed by the opto-touch foil (1303). The hypertext document that is shown comprises the specific information (1303) requested by the user about the: "Musée de la Chasse et la Nature".

From the same physical page (1302), the user can choose to request information for another museum of Paris. Alternatively, he can request information for another different type of service (e.g., "Cafeterias"). Lastly, the user can choose to go to another page of the same physical document.

ALTERNATIVE APPLICATIONS

Other several possible applications of the present invention are described below. Each of these applications basically use the same previously described method and system.

Installation and Engineering Instructions

A customer receives a complex computer equipment, with a hard-copy installation manual comprising drawings and schemes of the parts and subassemblies. With the opto-touch foil over any one of these schemes, the user can immediately see certain parts of the complex scheme illuminated with names, legends and instructions. Some of these illuminated items are identified as hyperlinks items and can be used to access additional information on a remote Web server or on a local computer. When the customer touches one of those hyperlinked items, instructions showing how the part needs to be installed or serviced, are instantly displayed over a reserved blank area on the hard-copy manual. A single printed copy with a general view of the equipment is sufficient to navigate with the system according to the present invention. The customer has just to press with his finger on the desired items on the surface of the installation manual.

Newspapers and Magazines

A subscriber reading a newspaper or magazine, may be interested in seeing additional information associated with the articles he reads. While reading the sports pages (e.g., on the New York Times), key events can be instantly recalled and displayed on demand over the same newspaper (e.g., the time of TV transmission of the next tennis match on Wimbledon, etc . . . ) simply by touching an illuminated icon, word, letter, symbol . . . on the article he is reading.

Paper-Based Advertising Linked to On-Demand Multimedia Ads

Many free-toll calls originate from people reading advertisements in newspapers or magazines or in direct mail ads. According to the present invention, people can instantly access and visualize product prizes, product details, phone numbers, promotions, discounts and coupons information, etc., simply by touching ads printed on paper catalogs.

Apart from the herein described applications, there are many other possible applications of this invention.

Phone numbers or phone icons can be displayed and highlighted on newspaper advertisements, magazines, books and pamphlets, allowing customers to make toll-free phone calls simply by touching an item displayed an highlighted on an opto-touch foil.

Home shopping retailers can provide catalogs of specialties. They can highlight with illuminated icons special offerings and promotions and show the related information on the same catalogs.

Distance learning applications can access and display additional information or references to complement the illustrations of student's books, etc. . .

What has been described is merely illustrative of the application of the principles of the present invention. Other arrangements and methods can be implemented by those skilled in the art without departing from the spirit and scope of the present invention.

What is claimed is:

1. A method of selecting electronic information from a physical document, and for displaying said selected electronic information over this physical document, said method comprising:
    identifying a physical document;
    identifying a page of said physical document;
    identifying and locating an electronic document associated with the identified page by referring to a document hyperlink table; said document hyperlink table comprising for each page of the physical document the identification and location of an electronic document;
    accessing and retrieving the electronic document associated with the identified page; and
    displaying the retrieved electronic document by means of an opto-touch foil placed over the identified page in conjunction with providing at least partial content of the identified page for viewing via the opto-touch foil.

2. The method according to claim 1, wherein the electronic document associated with the identified page comprises one or more hyperlinked items, said method further comprising:
    creating a page hyperlink table for the identified page;
    identifying the one or more hyperlinked items in the electronic document associated with the identified page; and
    for each identified hyperlinked item:
        identifying and locating information associated with said identified hyperlinked item;
        determining the position on the opto-touch foil of said identified hyperlinked item; and
        storing the identification and location of the information associated with said identified hyperlinked item and the position of said identified hyperlinked item on the opto-touch foil in the page hyperlink table.

3. The method according to claim 2, further comprising:
    aligning said opto-touch foil over said identified page of said physical document;
    determining the position of a point pressed on said opto-touch foil;
    identifying a selected hyperlinked item that corresponds to the position of the point pressed on said opto-touch foil by referring to the page hyperlink table;
    identifying and locating information associated with the selected hyperlinked item by referring to the page hyperlink table;
    accessing and retrieving the information associated with the selected hyperlinked item; and
    displaying the retrieved information by means of the opto-touch foil aligned over the identified page.

4. The method according to claim 3, wherein the method is used in a user system that is connected to a communication network comprising one or more servers, and wherein the information associated with the hyperlinked items is located on said one or more servers or locally on the user system.

5. The method according to claim 4, wherein the information associated with the hyperlinked items is located on the user system.

6. The method according to claim 5, wherein identifying and locating information associated with the selected hyperlinked item by referring to said page hyperlink table comprises:
    determining a destination address in the communication network where the information associated with the selected hyperlinked item can be accessed by referring to said page hyperlink table.

7. The method according to claim 6, wherein:
said communication network is an Internet Protocol (IP) network;
said servers are Web servers;
said user system comprises a Web browser;
said destination address is an Uniform Resource Locator (URL address); and
said information is a Web page.

8. The method according to claim 1, wherein the physical document is a hard-copy document or any type of physical surface such as an engraved, printed, painted, written surface, or any material such as paper, wood, plastic and of any form such as a newspaper, magazine, book, catalog, geographical map, photograph, painting.

9. The method according to claim 1, wherein the document hyperlink table associated with the physical document comprises additional information related to said document such as title, author, date and wherein the method further comprises:
accessing said additional information.

10. A system comprising:
an opto-touch foil;
a user system comprising:
means for selecting a page of the physical document;
means for retrieving an electronic document associated with the selected page; and
means for displaying the retrieved electronic document using the opto-touch foil placed over or under the selected page in conjunction with providing at least partial content of the selected page for viewing; and
a connection between said opto-touch foil and said user system.

11. The system according to claim 10, wherein the opto-touch foil is sensitive to the pressure exercised over any point of its surface and comprises a transparent film with light emitting elements for displaying electronic information.

12. A method for displaying selected electronic information on a physical document, the method comprising:
identifying a physical document;
selecting a page of the physical document;
retrieving an electronic document associated with the selected page; and
displaying the retrieved electronic document using an opto-touch foil placed over or under the selected page in conjunction with providing at least partial content of the selected page for viewing.

13. The method according to claim 12, wherein the retrieved electronic document is located through use of a lookup table.

14. The method according to claim 13, wherein the lookup table comprises a document hyperlink table that associates respective ones of a plurality of electronic documents with each page of a physical document.

15. The method according to claim 14, the method further comprising:
identifying a hyperlinked item in the electronic document associated with the selected page;
locating information associated with the identified hyperlinked item;
determining the position on the opto-touch foil of the identified hyperlinked item; and
storing both the location of the information associated with the identified hyperlinked item and the position of the identified hyperlinked item.

16. The method according to claim 15, further comprising:
placing the opto-touch foil over or under the identified page of the physical document;
identifying the position of a point pressed on the opto-touch foil;
identifying a selected hyperlinked item that corresponds to the identified position by referring to the stored position information;
locating information associated with the selected hyperlinked item by referring to the stored location information;
retrieving the information associated with the selected hyperlinked item; and
displaying the retrieved information by means of the opto-touch foil.

* * * * *